United States Patent [19]
Gamble

[11] Patent Number: 5,276,387
[45] Date of Patent: Jan. 4, 1994

[54] SLIDING MODE CONTROL SYSTEM

[75] Inventor: Jonathan B. Gamble, West Sussex, England

[73] Assignee: Vickers Systems Limited, Chichester, England

[21] Appl. No.: 802,149

[22] Filed: Dec. 3, 1991

[30] Foreign Application Priority Data

Dec. 8, 1990 [GB] United Kingdom ............... 9026736

[51] Int. Cl.[5] .................. G05B 13/02; G05B 19/403
[52] U.S. Cl. .................................. 318/135; 318/687; 318/433
[58] Field of Search ............... 318/135, 432, 433, 561, 318/568.1, 626, 632, 687

[56] References Cited

U.S. PATENT DOCUMENTS 4,962,976 10/1990 Takahashi ........................... 318/81

OTHER PUBLICATIONS

IBM Technical Disclosure Bulletin vol. 33, No. 4 Sep. 1990 New York U.S. pp. 377-381; "Sliding Mode Control for Arrivals and Small Movement" whole document.
Zeitschrift Fur Fl, wissenschaften vol. 23, No. 6, 1975, Feb. Braunschweig DE pp. 196-203; H. H. Von Salzen: "Regler Variabler Struktur Zur Reduzierung Der Komplexitat Von Flugzeugsystemen" paragraph 2-4; FIGS. 2-4.
Revue A. Tijdschrift vol. 7, No. 2, Apr. 1965, Bruxelles Be pp. 81-87; E. G. Gilbert: "Hybrid Computer Solution of Time Optimal Control Problems" pp. 82-87.

Primary Examiner—Steven L. Stephan
Assistant Examiner—Judson H. Jones
Attorney, Agent, or Firm—Barnes, Kisselle, Raisch, Choate, Whittemore & Hulbert

[57] ABSTRACT

Control method and apparatus for a moveable control member with n observed states, the apparatus incorporating a sliding mode control system, operable to maintain the state point of the moveable member on a predetermined hyperplane having $n-1$ dimensions, and comprising digital processor means operable to reference, at a first frequency, $n-1$ low order observed states to the predetermined hyperplane to establish a desired value of the highest order observed state, the control system further comprising comparator means operable to compare, at a second frequency, said desired value with the observed highest order state, the first frequency being less than the second frequency, and means responsive to the comparator means and operable to implement the control action necessary to maintain the state point on the predetermined hyperplane.

13 Claims, 11 Drawing Sheets

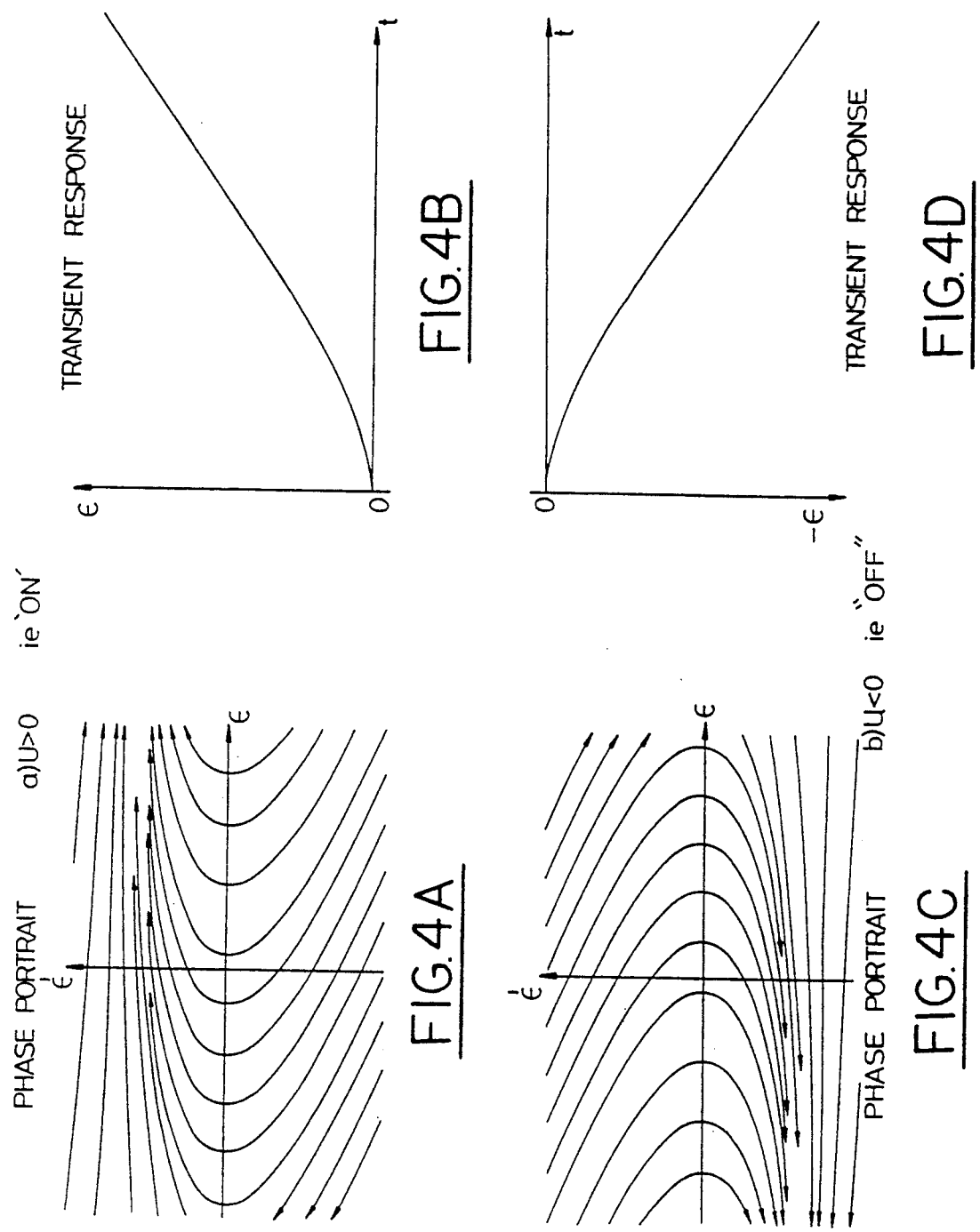

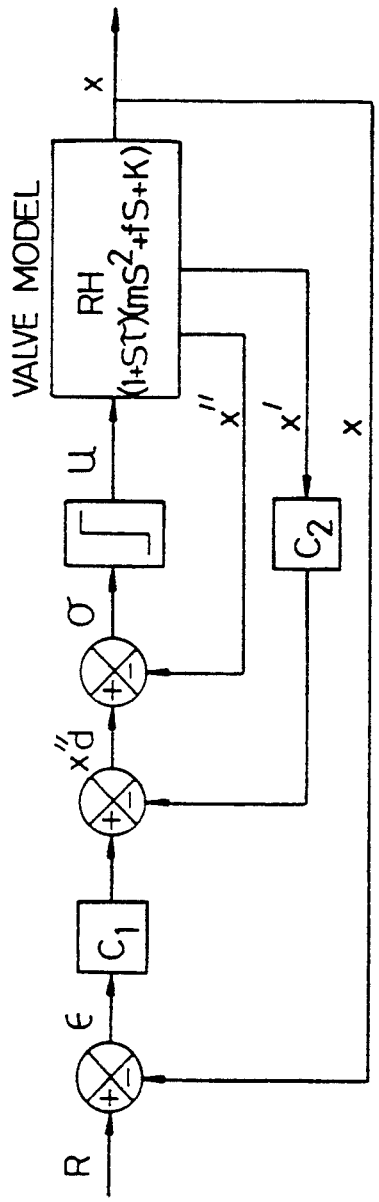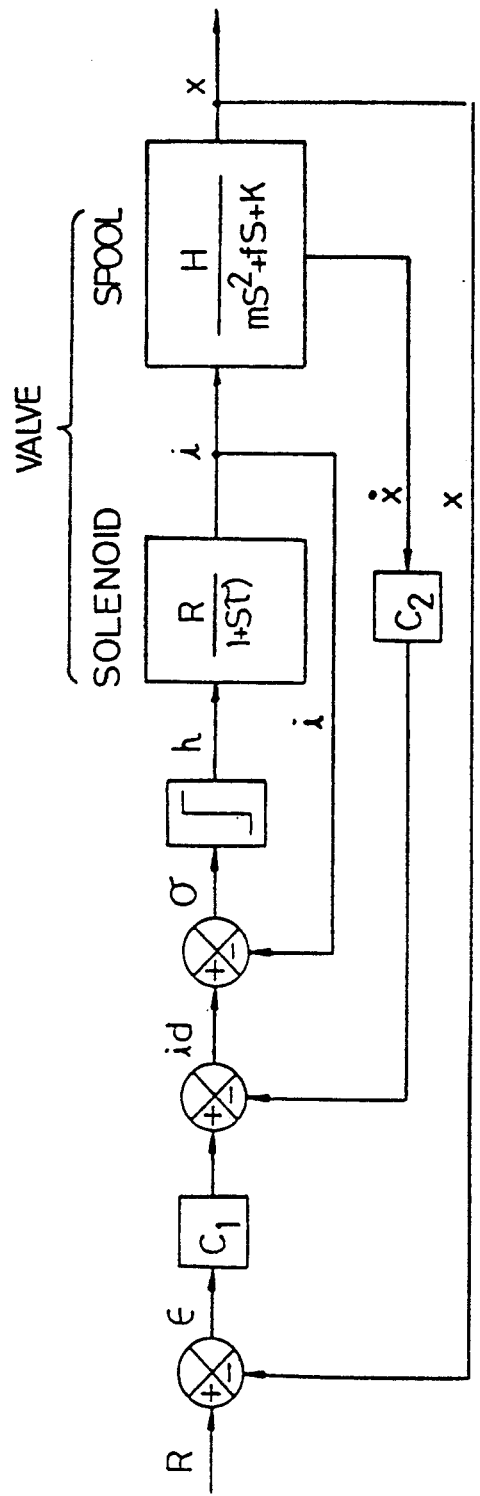

SLIDING MODE CONTROL SYSTEM

BACKGROUND OF THE INVENTION

This invention relates to method an apparatus for controlling apparatus and in general to such apparatus or method in which the magnitude of the drive signal to the apparatus under control is calculated. More specifically, the method and apparatus is based on the known sliding mode control technique which involves predefining the dynamic response of the output of the apparatus under control by describing the paths that output is to follow on a phase plane of the output. The phase plane is a two or more dimensional plane having as its axis the controlled states. The control action is determined by the position on the phase plane of the actual output compared with the path describing the desired trajectory or hyperplane. Consequently, sliding mode control is dependent on the measurement of the output of the apparatus under control and its derivatives and the calculation of the actual position of the output at a given instant on the phase plane. For sliding mode control, the number of derivatives required by the control system equals the predominant order of the apparatus under control.

DESCRIPTION OF THE PRIOR ART

Sliding Mode (SLM) control was initially developed in Russia and was the subject of much research there in the 1950's. However, the technique fell from favour after only a few years because of the lack of suitable high speed switching devices. This problem was overcome in the 1970's when cheap semiconductor power transistors became available, resulting in a resurgence of interest, this time mainly in the United States. Currently, research is being conducted in many different countries, though industrial applications are still rare. This small number of commercial examples is not because SLM control does not work; but rather that it is, for a number of reasons, more difficult to implement than conventional control methods.

Sliding mode control is a sub-class of Variable Structure Control (VSC). In practice most VSC systems are also SLM controllers, but this is not always the case. With conventional control techniques, the response of the closed loop system is determined by the dynamics of the control system in combination with the apparatus under control. Changes in the characteristics of the apparatus, or disturbance forces acting on it will both alter the dynamic response of the system.

The advantage of SLM control is that the response of the closed loop system is defined by parameters in the controller and is independent of both changes in the controlled apparatus, and disturbances acting on it. This is particularly beneficial when attempting to control proportional solenoid valves to which the present invention has particular, but not exclusive, reference. The natural response of these valves is third order, non-linear, and varies greatly from valve to valve. In addition, oil flow through the valve induces large flow forces which oppose further movement of the spool. Thus, good response is difficult to achieve using conventional control methods.

Any description of VSC or SLM systems relies on the use of phase space diagrams. The response of any system can be completely described by plotting the phase variables on a phase space diagram or phase portrait. The phase variables consist of the variable of interest (e.g. the valve spool position) and its derivatives (spool velocity, acceleration etc). The number of states or derivatives required is determined by the order of the plant. For a second order position control system, a step change in control input produces a step change in acceleration, and the dynamics of the plant are completely defined by the position and velocity. Thus the phase space has two dimensions, with position and velocity as the x and y axes, respectively. For position control systems of third order, a step change in the control input causes a step change in jerk (the rate of change of acceleration). The phase space thus has three dimensions with the axes being position, velocity and acceleration.

A point in phase space completely defines the state of the system at one instant in time. It has been variously referred to as the representative point, the image point, the state point or simply the state. It will be referred to herein as the state point. The path followed by the state point as the phase variables change with time is known as a phase trajectory.

The preceding discussion implies that spool position is the controlled variable. Such a system would act as a regulator; the controller would act to maintain the spool at the zero position. In order to allow commanded movement of the spool, position on the phase diagram must be replaced by position error (desired position-actual position). This will be referred to simply as "error" hereinafter. Using the derivatives of the error (in place of velocity, acceleration, etc) enables the plant to follow randomly varying inputs without error. However, it is in general very difficult to differentiate the error signal. This is particularly a problem with the valve controller where the position demand signal is generated by the customer and may contain significant quantities of noise. If velocity and acceleration are used in place of the error derivatives, the controlled apparatus exhibits error when tracking a changing position demand, but this error is eliminated once the demand reaches a steady value. Thus the problems of differentiating the error signal are avoided, but only at the expense of tracking accuracy.

It should be noted that time does not appear explicitly on the phase diagram but is implicit in the variables plotted.

Sliding mode control relies on forcing the controlled apparatus to exhibit two or more distinct types of dynamic behaviour; i.e. two or more different structures. There are two methods of inducing variable structure in a system; using switched gains, and by direct switching of the control signal.

a) Switched gain systems. Consider the closed loop system shown in FIG. 1 of the accompanying drawings. If the forward path gain K is large and positive, the natural response of the system is stable, but highly oscillatory. If the gain is large and negative, the response is unstable. These two structures are illustrated in FIG. 2.

b) Direct switching of the control signal. This type of system is illustrated in FIG. 3. The control signal to the apparatus under control is the output from a relay type element, and can therefore only have one of two values; "on" and "off". Unlike the previous system however, both structures are now unstable. If the two control input levels differ only in sign (i.e. if $U_{on} = -U_{off}$), the two phase portraits are mirror images of each other, as shown in FIG. 4.

The only requirement of the two structures is that they force the state point in opposite directions in certain regions of the phase space. Consider again the switched gain system of FIG. 1. If, as shown in FIG. 5, the positive gain is applied in regions I and III of the phase plane, and the negative gain applied in regions II and IV, then the phase trajectories oppose each other on either side of the line formed by the boundary between regions I and II, and between regions III and IV. Thus, the state point is forced onto this boundary or "switching line" from any initial point in phase space. Once there, the controller switches the system structure in order to keep the state point on the switching line. The state point is said to "slide" along the switching line; and the high-speed switching action is said to be a "sliding mode".

The equation of this boundary or switching line is:

$$O = -C\epsilon - \dot{\epsilon} \quad (1)$$

Where C is the slope of the line and $\epsilon$ is the error. This has the solution:

$$\epsilon = \epsilon_o e^{-t\epsilon} \quad (2)$$

Where $t_o$ is the initial error, t is time, and e is the universal constant. It can thus be seen that, if the state point reaches the switching line quickly, the response of the controlled apparatus (i.e. closed loop response) is that of a first order system; further, that this first order system has its parameter (the slope C) defined by the controller and is independent of the dynamics of the apparatus. In practice this means that the response remains the same for any values of the apparatus parameters which still allow the state trajectories to oppose each other on either side of the switching line.

It is readily shown that exactly the same response can be obtained by directly switching the control signal as shown in FIG. 3. In this case the phase space needs only to be divided into two regions as shown in FIG. 6. The use of direct switching of the control input has the major advantages that maximum control action is being used all the time. Thus faster response is possible (as described later). An apparent disadvantage of the method is that the control signal is switched discontinuously. In many systems, discontinuous control inputs are highly undesirable since they may excite higher modes (e.g. flexible modes in a robot arm), or simply wear out the input device. For many systems however, this is not a problem and for electrical machines it is often the most efficient method of control.

This concept is easily extended to third order plant. The phase space is now three dimensional, and the switching line now becomes a switching plane as shown in FIG. 7. The equation of this plane is:

$$\ddot{x} = C_1\epsilon - C_2\dot{x} \quad (3)$$

Which is the equation of a second order system with:

$$C_1 = \omega\eta^2)$$

$$C_2 = 2\zeta\omega\eta) \quad (4)$$

Where
$\omega\eta$ = natural frequency response (radians/sec) of the closed loop response
$\zeta$ = damping ratio of the closed loop response In general, for switched gain controllers, additional structures are required for higher order systems to ensure that the sliding mode exists over the entire surface of the switching plane. However, for direct switched controllers the two structures corresponding to "on" and "off" suffice.

Returning to second order systems. As previously stated, the slope C defines the time constant of the closed loop response. In the majority of applications, a fast transient response is desired; implying a large value of C and hence a steeply sloped switching line. However, if the choice of C is too ambitious, sliding motion will only be possible on a small region of the line. This is shown in FIG. 8 for the direct on/off controller, where sliding is only possible on the switching line segment A-B (compare this figure to (FIG. 6)).

It can be shown that a sliding mode breaks down when the demanded rate of change of the highest order derivative is greater than the apparatus under control can achieve. Differentiating equation (1) gives:

$$\ddot{x} = -C\dot{x} \quad (5)$$

Equation (5) shows that the magnitude of the acceleration increases with velocity; but more importantly, that it can be reduced by reducing the slope of the switching line. Thus, the problem of breakdown in the sliding mode can be overcome by employing a switching CURVE; with a steep slope at low velocities (near the origin of the phase plane), and a shallow slope away from the origin. Effectively, the switching line is bent so that sliding can take place over its entire length. Theoretically, any curve satisfying the above requirements could be used. However, the parabola is the most often chosen because this is a line of constant acceleration. Thus it is easy to define a switching curve on which the acceleration is always less than the plant can supply.

One problem remains with the use of parabolic switching lines. At the origin of the phase plane the line has infinite slope. Effectively this means that, for a given value of acceleration, the apparatus under control can move progressively faster as the amplitude is reduced. As the position error reduces to zero, the parabolic switching line assumes that the controlled apparatus can move infinitely fast. Of course in practice, this cannot be done and in fact leads to sliding breakdown at the origin. This problem can be overcome by "splicing" in a fast linear switching line segment close to the origin. Care must be taken when doing this however. In two dimensional phase space we have:

$$\ddot{x} = \frac{d\dot{x}}{dt} = \frac{d\dot{x}}{d\epsilon} \frac{d\epsilon}{dt} = -\dot{x}\frac{d\dot{x}}{d\epsilon} \quad (6)$$

Equation (6) implies that the acceleration on the switching line is determined by its slope and the velocity (in fact this equation is simply a generalised version of equation (5). Thus to prevent a sudden undesirable jump in acceleration at the point of intersection of the linear segment and the parabolic switching curve, the two curves must be blended together as shown in FIG. 9. This method ensures that at the point of intersection, the slope of the linear and parabolic lines are equal and, since the velocity must be identical for both lines, the acceleration must also be equal.

This concept is again equally applicable to third order systems. However, rather than being caused by excessive acceleration, sliding mode breakdown in third order plant is caused by excessive jerk. Thus the most desirable non-linear switching plane is a plane of constant jerk.

Due to the difficulty of designing non-linear switching planes, a plane constructed from linear segments can be used. Such a piecewise linear plane is shown in FIG. 10. This is a linear plane with limits on the maximum velocity and acceleration in an attempt to limit the maximum jerk.

So far in this discussion, only controllers using the phase variables (i.e. the output of the apparatus under control and its derivatives) have been discussed. Other variables can be used instead, but some deterioration in performance must be accepted. Consider the solenoid valve controller shown in FIG. 11. Motion on the sliding mode is defined by equation (3), where $C_1$ and $C_2$ are the same as in the feedback polynomial. For equation (3), the input to the switching element is ideally zero. The closed loop transfer function of the system can be obtained by setting $\sigma=0$ in FIG. 11, giving:

$$\frac{x}{R}(S) = \frac{C_1}{S^2 + C_2 S + C_1} \quad (7)$$

FIG. 12 shows the same system but with current feedback rather than acceleration. Setting $\sigma=0$ gives:

$$\frac{x}{R}(S) = \frac{HC_1}{(H+m)S^2 + (f+HC_2)S = k + HC_1} \quad (8)$$

Comparing equations (7) and (8), it can be seen that equations (7) contains only the controller parameters $C_1$ and $C_2$, whereas equation (8) also contains plant parameters k, f and m. Thus using the phase variables ensures that the closed loop response is independent of changes in the controlled plant.

Implementing direct on/off SLM control is, at first sight, extremely simple but in fact a number of problems arise which lead to a less than desirable performance of the apparatus under control. Two significant problems are the loss of accuracy of the higher order derivatives due to transducer noise being amplified in calculation of the derivatives, and the time delays introduced by the actual period of calculation of the derivatives. The reduction in performance is greatest when considering the highest order derivative which can change most rapidly and the corrective action needs therefore to be taken as quickly as possible to maintain robust control of the apparatus. The time delay relating to the actual calculation period may be reduced, of course, by using a powerful processor, for example, but the rapid sampling rates makes the control technique highly susceptible to transducer noise.

Previously reported sliding mode servosystems have transient response times of the order of 60 ms but even using a conventional analogue controller, a proportional control valve is capable of response times between 3 ms and 20 ms (depending on amplitude). The requirement for fast transient response give rise to two opposing factors:

a) a fast transient response is required without sliding mode breakdown which dictates the use of a non-linear switching plane. A jerk limited plane can only be implemented digitally, b) in excess of 200 times the desired closed loop bandwidth is required if a conventional control algorithm is to be implemented digitally. This can only be achieved using a digital signal processor (DSP) and is beyond the capabilities of present day microprocessors.

An object of the present invention is to make practical use of SLM in controlling a moveable member.

SUMMARY OF THE INVENTION

According to one aspect of the present invention there is provided control apparatus for a moveable control member with n observed states, the apparatus incorporating a sliding mode control system, operable to maintain the state point of the moveable member on a predetermined hyperplane having $n-1$ dimensions, and comprising digital processor means characterised in that the processor means is operable to reference at a first frequency, $n-1$ low order observed states to the predetermined hyperplane to establish a desired value of the highest order observed state, the control system further comprising comparator means operable to compare, at a second frequency, said desired value with the observed highest order state, the first frequency being less than the second frequency, and means responsive to the comparator means and operable to implement the control action necessary to maintain the state point on the predetermined hyperplane.

According to another aspect of the invention there is provided a method of controlling a moveable control member, characterised in that it comprises the steps of:

i) providing a sliding mode control system for a moveable control member having n observed states, the sliding mode control system being operable to maintain the state point of the moveable member on a predetermined hyperplane have $n-1$ dimensions, ii) referencing, at a first frequency, the $n-1$ low order observed states of the moveable control member to the predetermined hyperplane to establish a desired value of the highest order observed state, iii) comparing, at a second frequency, the desired value with the observed highest order state, the first frequency between less than the second frequency, and iv) using the result of said comparison to implement the control action necessary to maintain the state point on the predetermined hyperplane.

The present invention is based on realisation that equation (3) above can be rearranged as follows:

$$\sigma_1 = C_1\epsilon - C_2 \dot{x}$$

$$\sigma = \sigma_1 - \ddot{x} \quad (9)$$

This equation defines the acceleration required to stay on the switching plane (i.e. to maintain $\sigma=0$). If this value of acceleration is not attained, the state point falls from the switching plane, $\sigma$ is no longer zero and equation (3) no longer applies.

Referring to FIG. 11, if $x_d$ is the required acceleration, and x is the actual value, then $\sigma$ must be the acceleration error. It is the distance of the state point from the switching plane measured parallel to the acceleration axis. This is thus an acceleration control system in which the solenoid of the proportional control valve, for example, is switched either on or off in order to maintain a desired value of acceleration.

Simulation studies of an analogue controller have revealed that the oscillations caused by switching the drive voltage of a solenoid valve are mostly confined to the acceleration signal and that the position and velocity signals are relatively smooth. These signals could, therefore, be sampled less frequently than the acceleration signal without degrading system performance. In fact, the only reason the acceleration signal has to be sampled at such a high rate is in order to ensure that its controller "caught" the state point just as it crossed the switching plane. Any delay in switching the valve allows the build up of excessive solenoid current, which in turn causes undesirable oscillations in the spool position.

It was this research which lead to the development of the hybrid (dual frequency) control system according to the present invention.

The hyperplane or switching plane may be implemented digitally and a microprocessor outputs a signal representative of the acceleration required to maintain sliding. An analogue acceleration loop may implement the high speed switching action. Using such an arrangement, sampling rates as low as 3 kHz have successfully been used for the outer loop. Alternatively, an all-digital controller may be employed although this requires a much higher sample rate to obtain the highest derivative and implement the comparison for the inner (acceleration) loop. In this all-digital arrangement, different frequency of sampling rates for the inner and outer loops would be ed in accordance with the invention.

As already mentioned, the switching plane need not be linear. However, the control program must be fast in order to execute even at the lower sample rates referred to above. The most efficient method of implementing complicated switching surfaces is to use a look-up table. This table lists the required acceleration at a large number of known error and velocity values of the apparatus under control. By comparing the actual error and velocity with these known values, the closest acceleration values can be obtained from the table. Interpolation can then be used to estimate the acceleration to output to the analogue loop. The control program may, therefore, execute the following steps:

a) Read the position demand, spool position and velocity from the analogue-to-digital convertor(s).
b) Calculate the position error (demand minus actual).
c) Find the close values of error (one on either side) for which the look-up table gives acceleration values.
d) Do the same for the velocity.
e) Take the four acceleration values found in (c) and (d) and estimate acceleration at the actual values of error and velocity using bilinear interpolation.
f) Output this required value of acceleration.

Since this method of control is based on continuous time, rather than discrete time (sampled data) control theory, the actual sample rate is relatively unimportant as long as it is above the minimum value discussed above. Thus, the main control loop may not need to be timed and can be allowed to execute as fast as possible.

Essentially, the hybrid controller of the present invention relies on being able to sense the minute vibrations of the apparatus under control, for example the spool of a solenoid proportional valve caused by the on/off switching of the solenoid current. This requires a high quality, high bandwidth acceleration transducer. Attempts at obtaining velocity and acceleration by differentiating the spool position signal failed due to the relatively low bandwidth and high noise level in the signal.

Alternative measurement techniques are:
a) Direct measurement of acceleration using accelerometers. It should be noted that two accelerometers would be required to measure the relative acceleration between a valve spool and the valve body, for example.
b) Direct measurement of velocity. Using a velocity transducer has been found to give a sufficiently good signal to obtain acceleration by differentiation.
c) Indirect measurement using a state observer. For this technique to work effectively, a good model of the apparatus under control is required. Non-linear and adaptive observation techniques can be used but these are digital techniques, thus requiring fast sample rates.

Accordingly, it is a preferred feature of the present invention to employ a velocity transducer to obtain acceleration of the apparatus under control, for example the spool of a proportional solenoid valve, the acceleration being obtained by differentiating the velocity signal. This differentiation may be carried out using an analogue filter. As with insufficient sample rates, insufficient bandwidth in the acceleration signal causes a reduction in the switching frequency, with a resultant increase in spool, for example, oscillations. Thus, the differentiating filter preferably has a bandwidth approximately 15-20 times the maximum bandwidth of the apparatus under control.

BRIEF DESCRIPTION OF THE DRAWINGS

Sliding mode method and apparatus for controlling a proportional solenoid control valve in accordance with the present invention will now be described in greater detail, by way of example, with reference to the further accompanying drawings, in which:

FIGS. 4a-4d, 5a and 5b show responses of the direct on/off system.
FIGS. 11 and 12 show third order SLM valve control systems.

DESCRIPTION OF PREFERRED EMBODIMENT

Figure 1:
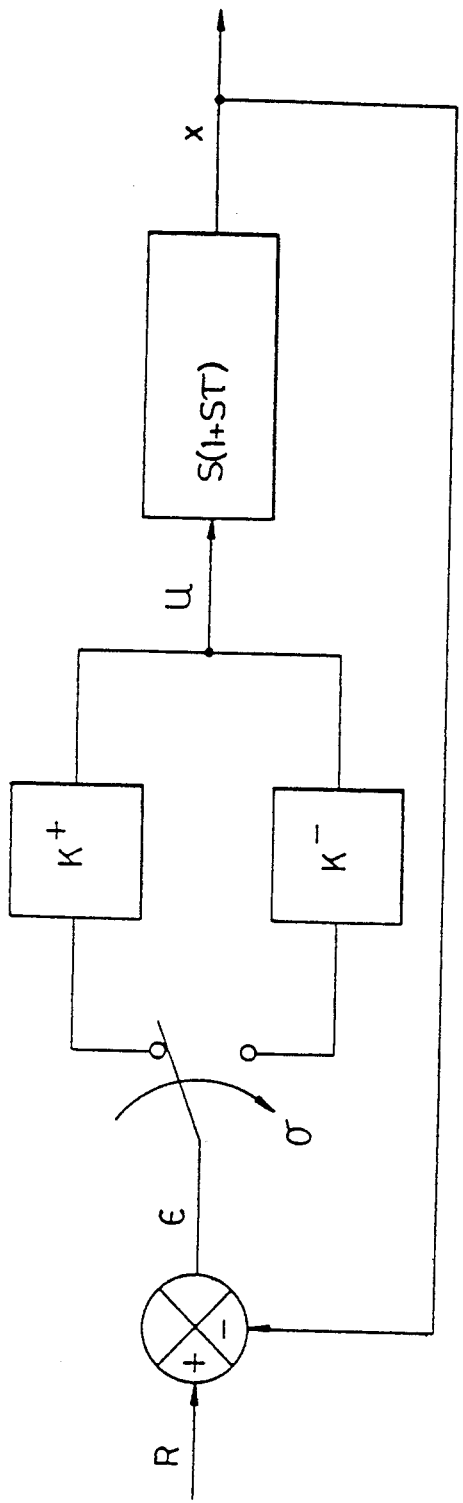
FIG. 1 is a switched gain system.
Figure 3:
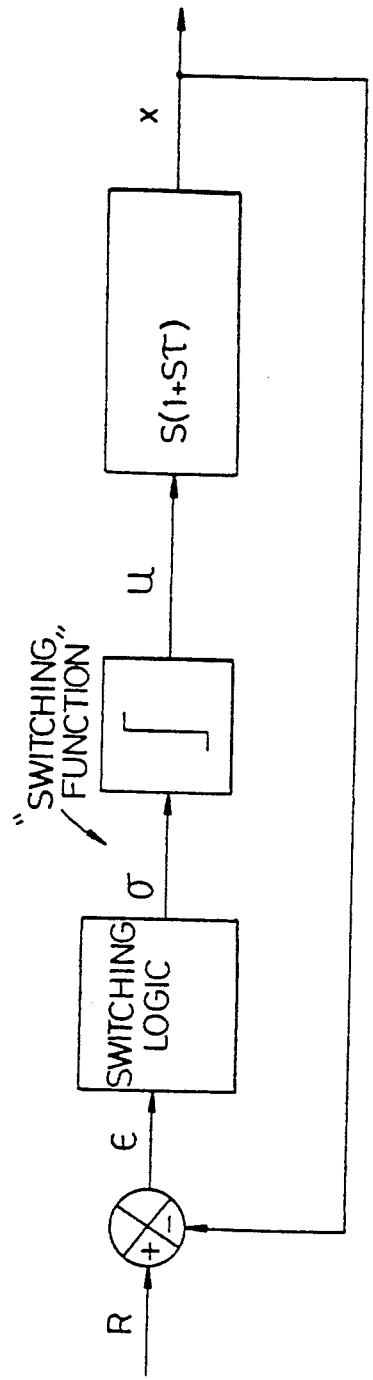
FIG. 3 is a direct on/off system.
Figure 2A:
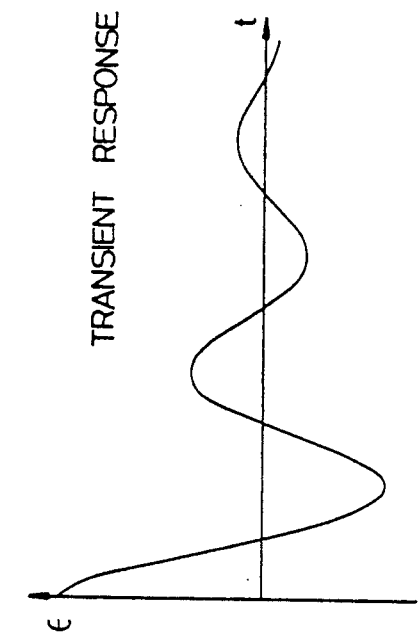
FIGS. 2a-2d show responses of the FIG. 1 system.
Figure 2B:
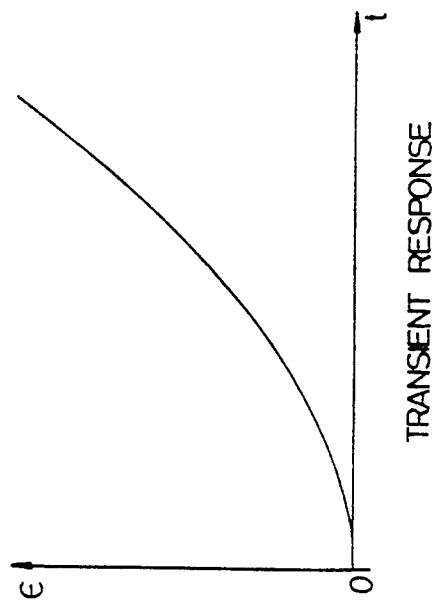
Figure 2C:
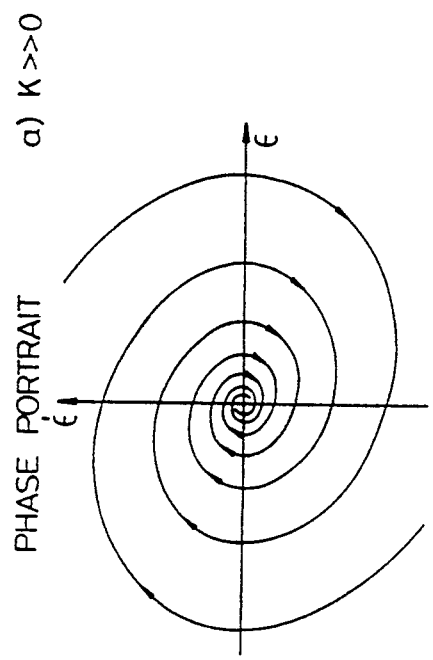
Figure 2D:
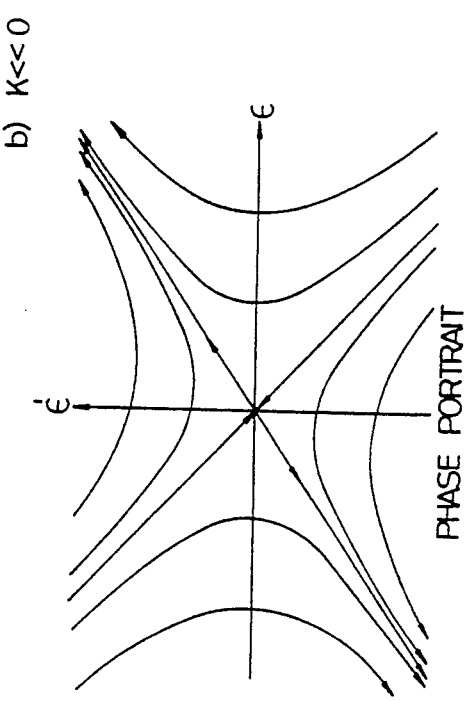
Figure 5A:
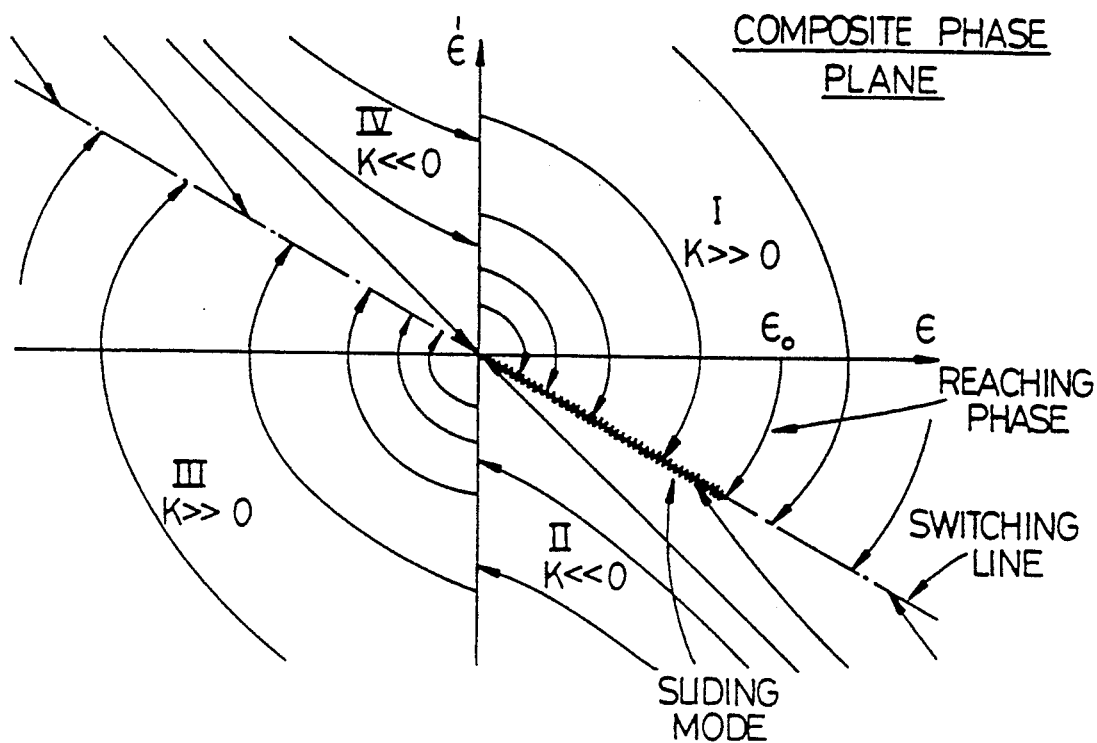
Figure 5B:
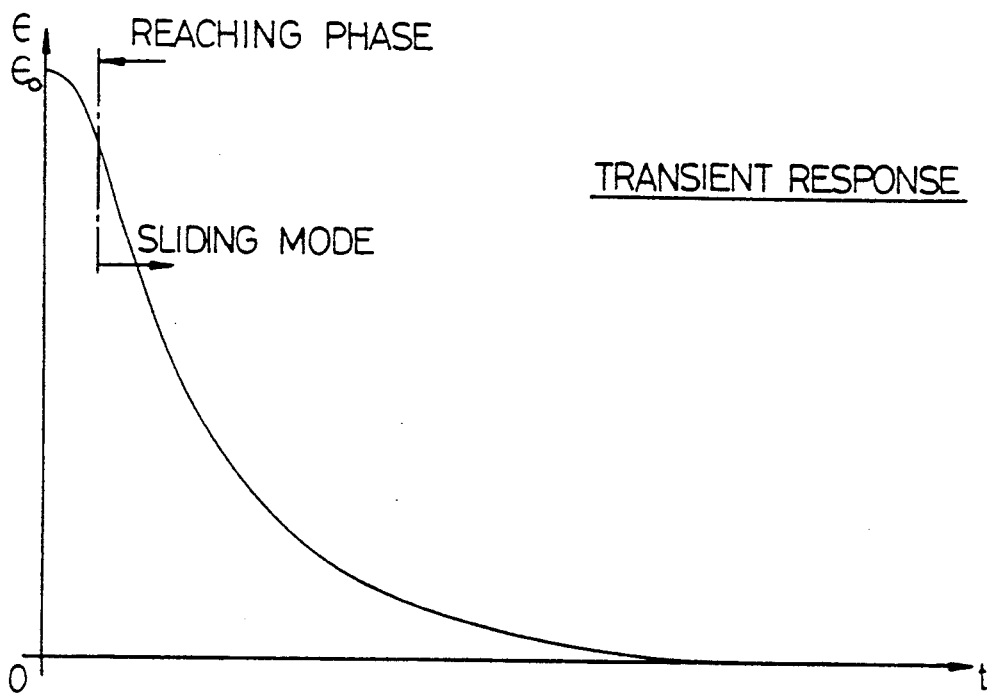
Figure 6:
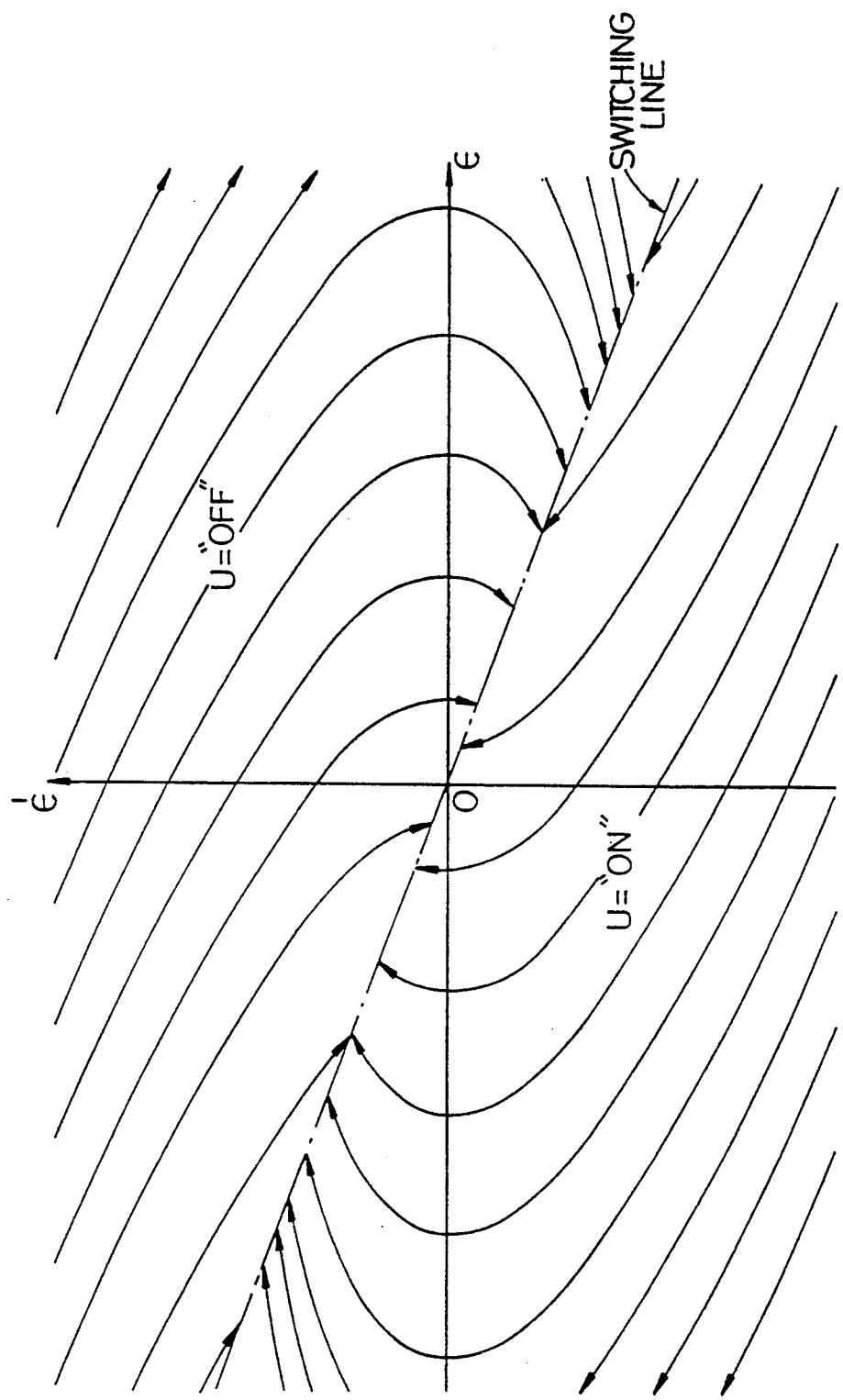
FIG. 6 is a composite phase portrait of the direct on/off system.
Figure 7:
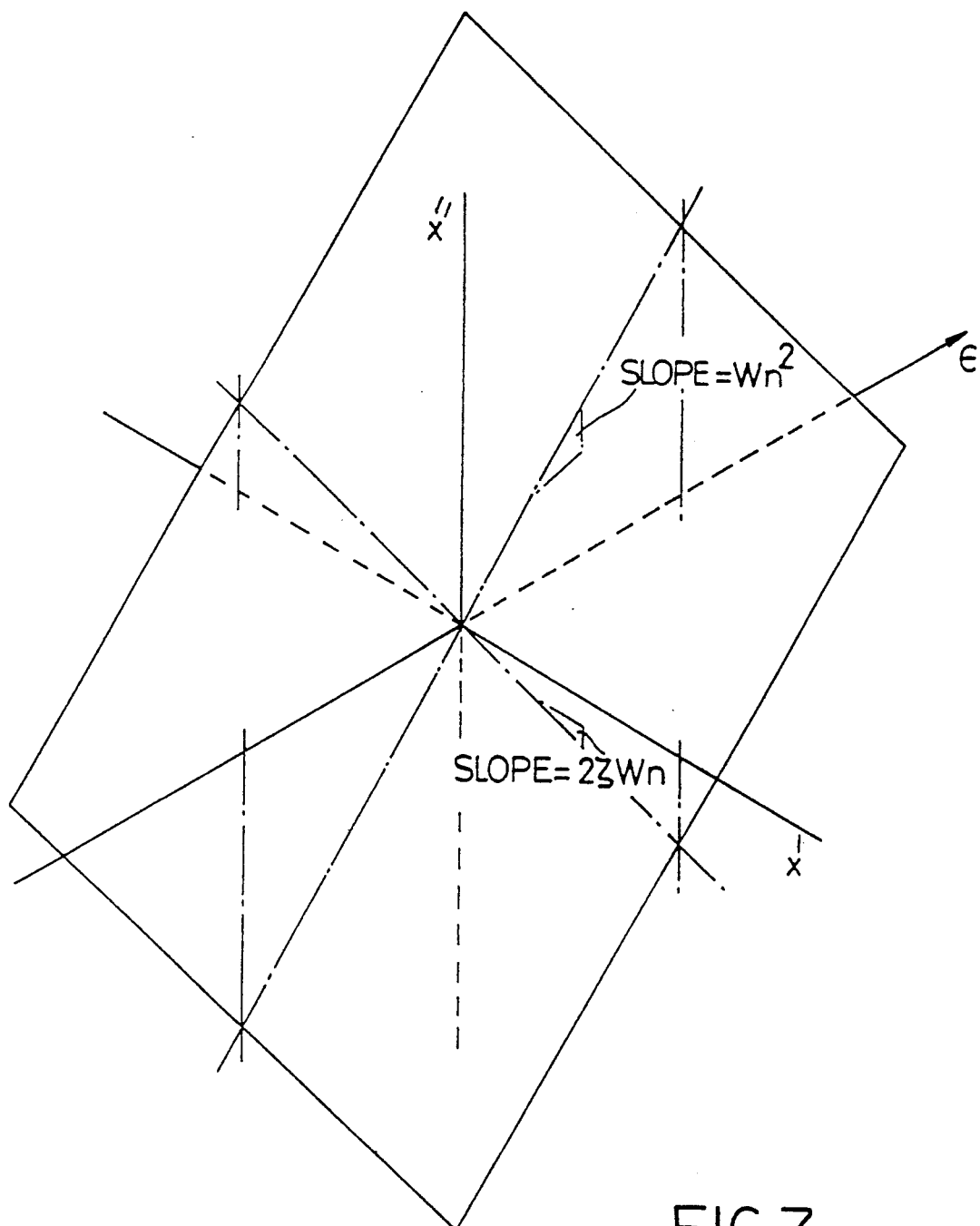
FIG. 7 shows a third order switching plane.
Figure 8:
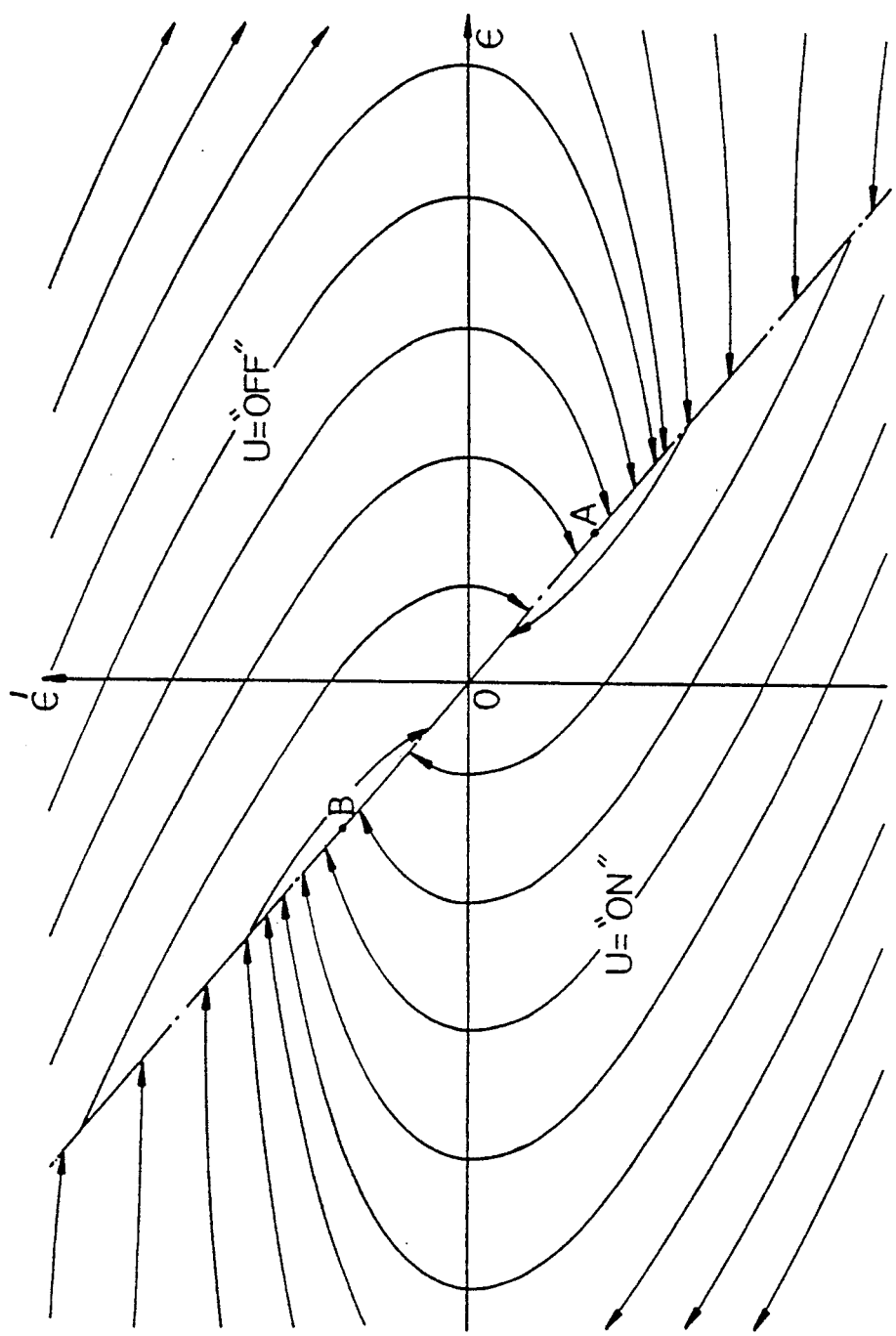
FIG. 8 shows a composite phase portrait-steep switching line.
Figure 9:
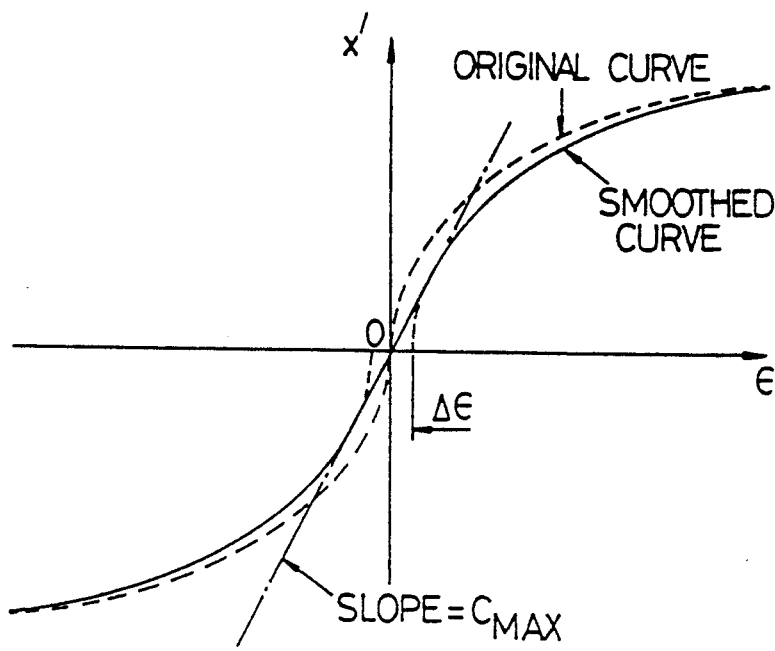
FIG. 9 show a 2nd order switching line smoothing strategy.
Figure 10:
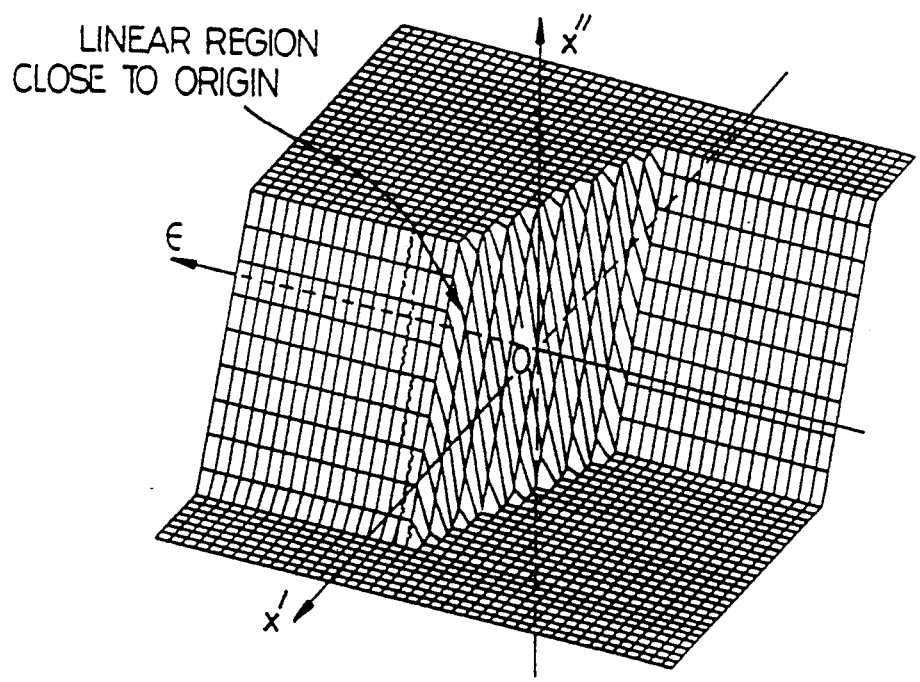
FIG. 10 shows a paces linear switching plane.
Figure 13:
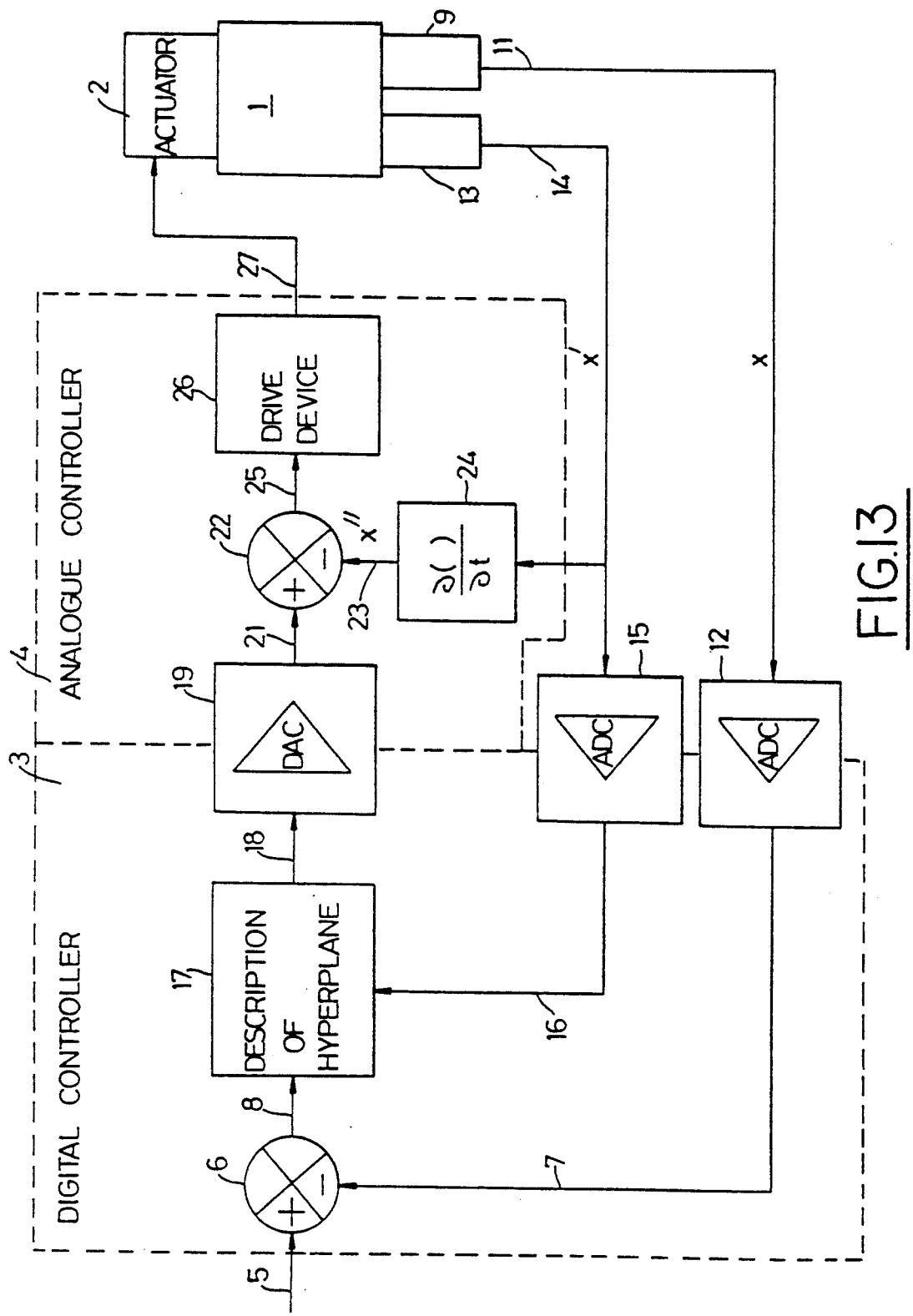
FIG. 13 is a schematic block diagram of control apparatus in accordance with the present invention as applied to a proportional solenoid value.

Referring to FIG. 13, this illustrates sliding mode control apparatus for a proportional solenoid valve 1 driven by a solenoid 2, the control apparatus comprising a digital controller 3 and an analogue controller 4. A proportional solenoid valve is typically a predominantly third order system and thus it is necessary to observe three derivatives or states of the spool, namely position, velocity and acceleration, position and velocity being low order observed states and acceleration being the highest order observed state.

An input signal 5 is applied to the digital controller 3, more specifically to a comparator 6 of the digital controller to which is also applied on line 7 a digital representation of spool position, the derivation of which will be described hereinafter. The output of the comparator 6 on line 8 represents the difference between the desired spool position and the actual spool position. The spool position signal on line 11 is derived from a position sensor 9, the analogue output x of which is applied via line 11 to an analogue-to-digital convertor (ADC) 12, the digital output of which is applied, as already mentioned, on line 7 to the comparator 6.

A velocity sensor or transducer 13 is also provided on the valve 1 in order to sense the velocity of the spool, the analogue output signal x of which is applied on a line 14 to a further ADC 15, the digital output of which is applied on line 16 to a part 17 of the digital controller containing a description of a predetermined hyperplane, to which part is also applied the output of the comparator 6. The hyperplane is linear and has n−1 dimensions, that is to say one less than the order of the system involved and hence in the present instance of a third order system, the hyperplane has two dimensions, namely position and velocity.

The linear hyperplane may be defined using equation (3) rearranged to give:

$$\epsilon = \frac{\ddot{x}}{C_1} + \frac{C_2 \dot{x}}{C_1}$$

The spool error signal on line 8 and the spool velocity signal on line 16 are referenced against the predetermined hyperplane to provide a digital signal on line 18 representative of desired spool acceleration x. This desired acceleration signal is applied on line 18 to a digital-to-analogue convertor (DAC) 19 to provide an analogue version of the desired spool acceleration signal on line 21, which signal is applied to a further comparator 22. A signal representative of the actual acceleration x of the spool is also applied to the comparator 22 on line 23. This "actual" acceleration of the spool is in fact an estimated acceleration and is derived by a differentiator 24 from the velocity signal provided by the velocity transducer 13. It is found that this derivation of "actual" acceleration of the spool is a sufficiently reliable signal as opposed to attempting to measure the actual acceleration using an acceleration transducer.

The output of the comparator 22 on line 25 is used to implement the control action necessary to maintain the state point of the valve spool on the predetermined hyperplane. More specifically, the output signal from the comparisons 22 is applied to a driver 26 which amplifies the signal to provide a power drive signal on line 27 which is applied to the solenoid 2.

In accordance with the present invention, the low order observed states of position and velocity are referenced to the hyperplane at 17 at a first frequency in the digital controller 3 and the comparator 22 compares the desired value of the highest order observed state (in this instance acceleration) with the observed highest order state at a second frequency which is greater than the first frequency, this comparison being effected within the analogue controller 4. Thus, the switching hyperplane is implemented digitally and the digital processor, which may be a microprocessor, outputs the acceleration required to maintain sliding mode control. The analogue controller 4 entrusted with the acceleration loop implements the high speed switching action required. With this arrangement, sampling rates as low as 3 kHz have successfully been used.

Figure 14:
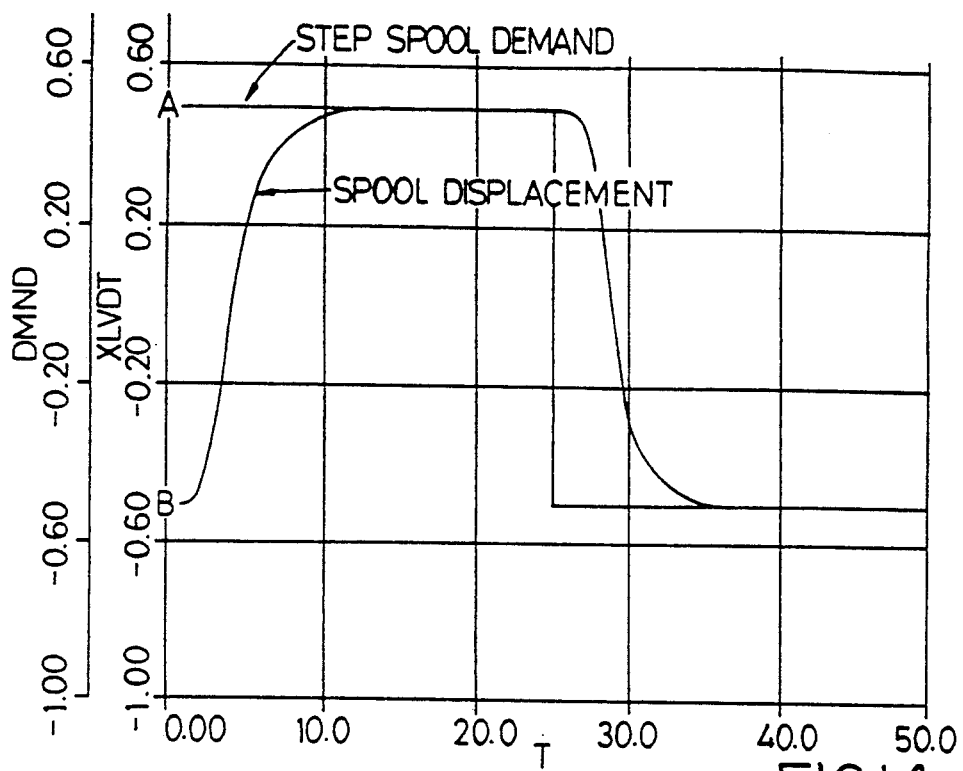
FIGS. 14 and 15 are graphs illustrating the response of alternative control apparatus in accordance with the invention.
Figure 15:
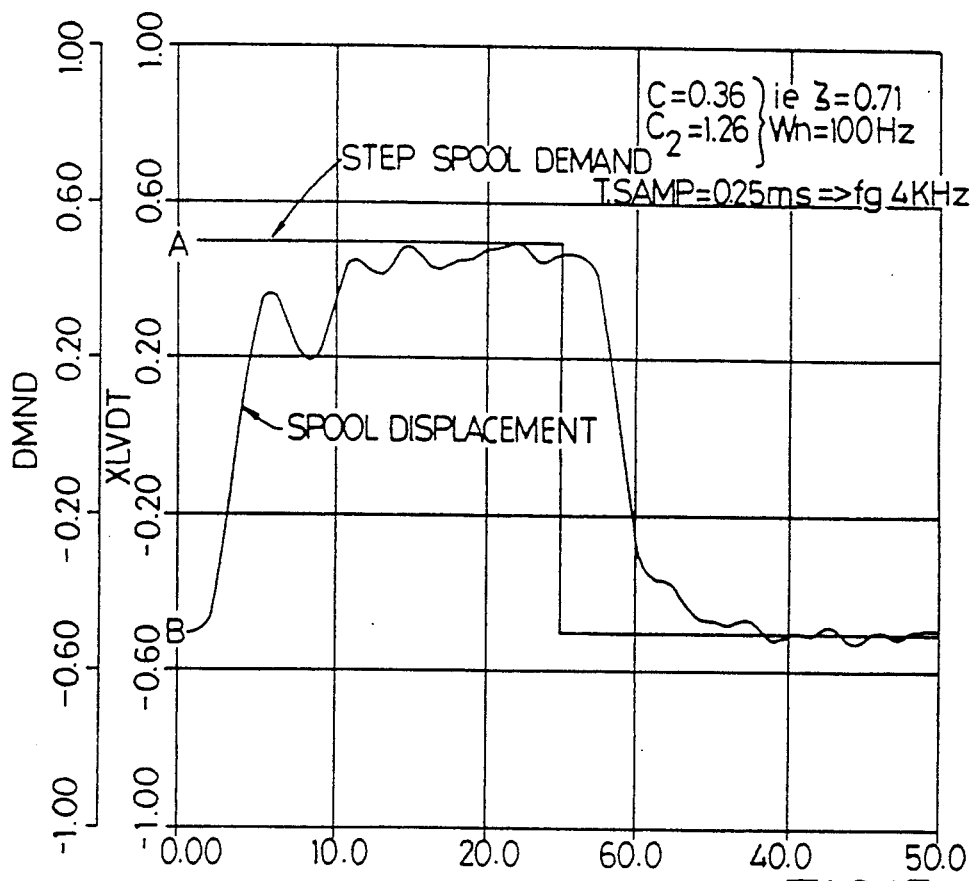

FIG. 14 shows the response of the control system of FIG. 13 using a digital controller in conjunction with an analogue controller, and FIG. 15 illustrates the response using a fully digital controller, in both cases the sample rate being 4 kHz and the switching hyperplane being linear with $\omega\eta = 100$ Hz and $\zeta = 1$. With an all-digital controller, the frequency of comparison of the observed highest order state with the estimated highest order state is still higher than the referencing of the observed low order states to the predetermined hyperplane.

It will be appreciated that with this hybrid control system in accordance with the invention, the performance of the moveable member is improved by allowing rapid changes in actual or observed highest order state to result in changes in control action as soon as possible, while allowing the more complex referencing of the low order observed states to the hyperplane to be handled more slowly. A dual rate algorithm may be used which compares the required highest order state with the observed highest order state more frequently than a new desired highest order state is calculated. The advantage of this technique is that the control action on the valve or other moveable member taken as a result of the comparison between the desired and observed highest order state may be simplified to a bang-bang or on/off control based only on the sign of the comparison rather than its magnitude. This simplification reduces the cost of the output electronics needed to drive the valve or other moveable member and typically eliminates the need for current feedback.

The hyperplane need not be linear and co-pending GB Patent Application No. 9026735.2 is specifically directed to such an arrangement. This disclosure is incorporated herein, in its entirety, by reference.

I claim:

1. Control apparatus for a moveable control member with n observed states, the apparatus incorporating a direct on/off sliding mode control system, operable to maintain the state point of the moveable member on a predetermined hyperplane having n−1 dimensions, and comprising digital processor means, characterised in that the processor means is operable to reference, at a first frequency, n−1 low order observed states to the predetermined hyperplane to establish a desired value of the highest order observed state, the control system further comprising comparator means operable to compare, at a second frequency, said desired value with the observed highest order state, the first frequency being less than the second frequency, and switching means responsive to the comparator means and operable to implement the switching control action necessary to maintain the state point on the predetermined hyperplane.

2. Apparatus according to claim 1, characterised in that one of the n−1 low order observed states is the error between an externally applied input signal and the output of the moveable control member.

3. Apparatus according to claims 1, characterised in that the highest order state is observed using a dual rate algorithm in the processor.

4. Apparatus according to claims 1, characterised in that the highest order state is referenced to the hyperplane using analogue means.

5. Apparatus according to claim 1, characterised in that the low order observed states of the moveable control member are referenced to the hyperplane using digital computational means in the digital processor means.

6. Apparatus according to claim 1, characterised in that the digital processor means comprises digital microprocessor means.

7. Apparatus according to claim 1, characterised in that the hyperplane is linear and is defined by the equation:

$$\epsilon = \frac{\ddot{x}}{C_1} + \frac{C_2 \dot{x}}{C_1}$$

where $\epsilon$ = error

C—slope of the hyperplane.

8. Apparatus according to claim 1, characterised in that the hyperplane is non-linear.

9. Apparatus according to claim 1, characterised in that the moveable control member has three observed states, namely acceleration, velocity and position, in that means are provided for measuring the low order states of velocity and position, and in that differentiation means are provided responsive to the means measuring velocity and operable to provide a measure of the highest order state of acceleration.

10. A method of controlling a moveable control member, characterised in that it comprises the steps of:
   i) providing a sliding mode control system for a moveable control member having n observed states, the sliding mode control system being operable to maintain the state point of the moveable member on a predetermined hyperplane have n−1 dimensions,
   ii) referencing, at a first frequency, n−1 low order observed states of the moveable control member to the predetermined hyperplane to establish a desired value of the highest order observed state,
   iii) comparing, at a second frequency, the desired value with the observed highest order state, the first frequency between less than the second frequency, and
   iv) using the result of said comparison to implement the control action necessary to maintain the state point on the predetermined hyperplane.

11. A method according to claim 10, characterised in that the step of observing the highest order state is implemented using a dual rate algorithm in digital processing means forming part of the sliding mode control system.

12. A method according to claim 10, characterised in that the step of observing the highest order state is implemented using analogue means.

13. A method according to claim 10, characterised in that the step of referencing the low order states to the hyperplane is implemented digitally by digital processor means.

* * * * *